(12) United States Patent
Cvijetic et al.

(10) Patent No.: US 8,897,648 B2
(45) Date of Patent: Nov. 25, 2014

(54) ORTHOGONAL FREQUENCY DIVISION MULTIPLE ACCESS TIME DIVISION MULTIPLE ACCESS-PASSIVE OPTICAL NETWORKS OFDMA TDMA PON ARCHITECTURE FOR 4G AND BEYOND MOBILE BACKHAUL

(71) Applicant: NEC Laboratories America, Inc., Princeton, NJ (US)

(72) Inventors: Neda Cvijetic, Plainsboro, NJ (US); Milorad Cvijetic, Tucson, AZ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 88 days.

(21) Appl. No.: 13/755,627

(22) Filed: Jan. 31, 2013

(65) Prior Publication Data
US 2013/0216229 A1 Aug. 22, 2013

Related U.S. Application Data

(60) Provisional application No. 61/600,982, filed on Feb. 20, 2012.

(51) Int. Cl.
| | |
|---|---|
| H04J 14/00 | (2006.01) |
| H04J 4/00 | (2006.01) |
| H04B 10/00 | (2013.01) |
| H04J 14/02 | (2006.01) |
| H04B 10/2575 | (2013.01) |

(52) U.S. Cl.
CPC .... *H04B 10/25753* (2013.01); *H04B 10/25754* (2013.01)
USPC .................. 398/115; 398/66; 398/76; 398/89

(58) Field of Classification Search
USPC ............................ 398/66, 68–71, 76, 89, 115
See application file for complete search history.

(56) References Cited

U.S. PATENT DOCUMENTS

| | | | | |
|---|---|---|---|---|
| 8,184,979 | B2 * | 5/2012 | Wei et al. ......................... | 398/89 |
| 8,233,797 | B2 * | 7/2012 | Qian et al. ....................... | 398/67 |
| 2008/0248805 | A1 * | 10/2008 | Han et al. ........................ | 455/450 |
| 2010/0040372 | A1 * | 2/2010 | Gejbrowitz et al. ............ | 398/71 |
| 2013/0045012 | A1 * | 2/2013 | Kanonakis et al. ............. | 398/66 |

OTHER PUBLICATIONS

N. Cvijetic et al., "1.2 Tb/s symmetric WDM-OFDMA-PON over 90km straight SSMF and 1:32 passive split with digitally-selective ONUs and coherent receiver OLT," Proc. 2011 IEEE/OSA Opt. Fiber Common. Conf. (OFC), Los Angeles, CA, paper PDPD7, Mar. 2011.

(Continued)

*Primary Examiner* — Dalzid Singh
(74) *Attorney, Agent, or Firm* — Joseph Kolodka

(57) ABSTRACT

Systems and methods are provided for network communication using wireless base stations and an optical orthogonal frequency division multiple access (OFDMA) signal generated on an optical wavelength, with the optical OFDMA signal being composed of a plurality of OFDMA subcarriers. A multi-level modulator modulates each of the plurality of OFDMA subcarriers. A single optical wavelength propagates each of the plurality of OFDMA subcarriers to different base stations; a passive optical splitter delivers the optical OFDMA signal to different base stations; and an OFDMA subcarrier de-multiplexer delivers and extracts traffic for each of the base stations in an electronic-domain, wherein the extracted traffic is remodulated in a wireless signal format. Antennas at each of the base stations transmit wireless signals, and the wireless signals are recovered and processed from the base stations.

12 Claims, 6 Drawing Sheets

(56) References Cited

OTHER PUBLICATIONS

P.A. Gamage et al., "Design and analyis of digitized RF-over-fiber links," IEEE/OSA Jnl. Lightwave Technol., vol. 27, No. 15, Jun. 2009.

T. Tashiro et al., "40km Fiber Transmission of Time Domain Multiplexed MIMO RF Signals for RoF-DAS over WDM-PON," IEEE/OSA Opt. Fiber Commun. Conf. (OFC), Los Angeles, CA, paper OTu2H.4, Mar. 2012.

Y. Yang et al., "Digitized RF-over-fiber technique as an efficient solution for wideband wireless OFDM delivery," IEEE/OSA Opt. Fiber Commun. Conf. (OFC), Los Angeles, CA, paper OTu2H.6, Mar. 2012.

* cited by examiner

ORTHOGONAL FREQUENCY DIVISION MULTIPLE ACCESS TIME DIVISION MULTIPLE ACCESS-PASSIVE OPTICAL NETWORKS OFDMA TDMA PON ARCHITECTURE FOR 4G AND BEYOND MOBILE BACKHAUL

RELATED APPLICATION INFORMATION

This application claims priority to provisional application Ser. No. 61/600,982 filed on Feb. 20, 2012, incorporated herein by reference.

BACKGROUND

1. Technical Field

The present invention relates to wireless access networks, and, more particularly, to $4^{th}$ generation and beyond ($4^+$G) mobile backhaul over orthogonal frequency division multiple access/time division multiple access—passive optical networks (OFDMA/TDMA-PON).

2. Description of the Related Art

The proliferation of fourth-generation (4G) mobile devices is dramatically changing the wireless access network and its wired counterpart. As data rates swell to 100 Mb/s-1 Gb/s per cell site (as in 4G LTE (Long Term Evolution) and LTE Advanced, respectively), the achievable wireless reach drops, increasing cell density and decreasing per-cell coverage area to ~10-20 $m^2$. A last mile (1-2 km) $4^+$G mobile backhaul link is thus needed to support over 200 cells and $20^+$ Gb/s per-link rates. To deliver high speeds at low latency, backhaul via fiber-optic passive optical networks (PON) is highly attractive. However, using a conventional approach of deploying a wavelength per cell to keep latency low is prohibitive for $200^+$ cells per fiber. Likewise, using a conventional approach of assigning an optical time-domain slot per cell is prohibitive due to the high time delay (i.e., latency) it causes, as well as unpredictable delay variability (i.e., jitter), both of which are not acceptable for low-latency, low-jitter data transmission in mobile backhaul. Moreover, fully centralized digital signal processing (DSP), as in conventional digital radio over fiber (dRoF), is expedient for point-to-point/low-density scenarios, but would mandate intensive buffering and the DSP equivalent of a long-haul transceiver at the traffic aggregation point of each $4^+$G backhaul link to satisfy latency constraints.

A prominent conventional approach has been to dedicate an optical wavelength per each wireless base station. The resulting architecture is a Passive Optical Network (PON) which requires at least one wavelength for every wireless base station. Although several variants of a PON approach for mobile backhaul exist, they either obviate the possibility for sub-wavelength statistical bandwidth multiplexing, incur prohibitive latency and jitter during transmission, and/or require at least one dedicated wavelength per base station. Indeed, to enable low-latency mobile backhaul for a femtocell network with ~1000 base stations using the conventional wavelength-per-cell approach, 1000 wavelengths would be needed, which creates tremendous network management issues. Finally, the wavelength-per-cell PON approach can also increase cost and complexity due to the need for wavelength-customized hardware, which results in significant wavelength management and component inventory challenges.

SUMMARY

A method for network communication using a plurality of base stations and an optical backhaul network, the method comprising: generating an optical orthogonal frequency division multiple access (OFDMA) signal on an optical wavelength, with the optical OFDMA signal being composed of a plurality of OFDMA subcarriers; modulating each of the plurality of OFDMA subcarriers using multi-level modulation; propagating each of the plurality of OFDMA subcarriers to different base stations using a single optical wavelength over a passive optical network (PON) using a passive optical splitter; delivering the optical OFDMA signal to a plurality of different base stations using a passive optical splitter extracting traffic for each of the plurality of base stations in an electronic-domain using OFDMA subcarrier de-multiplexing, wherein the extracted traffic is remodulated in a wireless signal format; transmitting a wireless signal using antennas at each of the plurality of base stations; and recovering and processing the wireless signal from the plurality of base stations.

A system for network communication using a plurality of base stations and an optical backhaul network, the system comprising: an optical orthogonal frequency division multiple access (OFDMA) signal generated on an optical wavelength, with the optical OFDMA signal being composed of a plurality of OFDMA subcarriers; a multi-level modulator configured to modulate each of the plurality of OFDMA subcarriers; a single optical wavelength configured to propagate each of the plurality of OFDMA subcarriers to different base stations over a passive optical network (PON); a passive optical splitter used to deliver optical OFDMA signal to a plurality of different base stations; an OFDMA subcarrier de-multiplexer configured to deliver and extract traffic for each of the plurality of base stations in an electronic-domain, wherein the extracted traffic is remodulated in a wireless signal format; and antennas at each of the plurality of the base stations which transmit wireless signals, wherein the wireless signals are recovered and processed from the plurality of base stations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

TDMA-PON) architecture for 4G and beyond mobile backhaul with spectra according to the present principles.

DETAILED DESCRIPTION OF PREFERRED EMBODIMENTS

Figure 1:
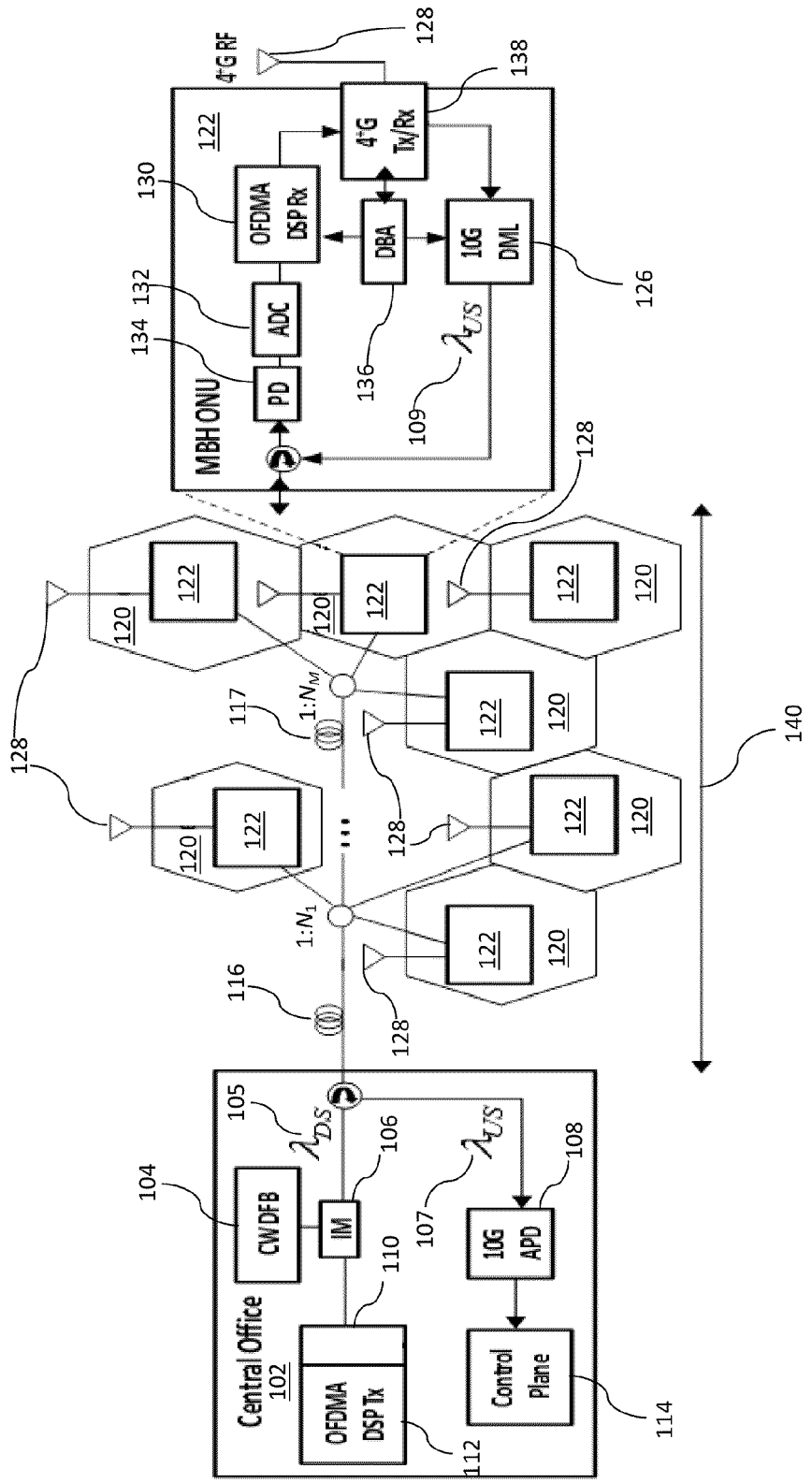
FIG. 1 is a downstream/upstream (DS/US) Orthogonal Frequency Division Multiple Access/Time Division Multiple Access-Passive Optical Network (OFDMA/TDMA-PON) architecture according to the present principles.

The present principles provide a system and method for an Orthogonal Frequency Division Multiple Access/Time Division Multiple Access-Passive Optical Network (OFDMA/TDMA-PON) for >100 Mb/s per-cell mobile backhaul to a plurality of cells over an optical channel medium (e.g., Standard Single Mode Fiber (SSMF), etc.) which combines high speed, low latency, and low cost for 4G and beyond mobile backhaul.

As data rates increase to 1 Gb/s and beyond per mobile device, the achievable transmission distance of the wireless signal decreases such that an increasingly high density of wireless base stations is needed. Each base station would then feature a smaller coverage area, referred to as a "femtocell." Moreover, the wired network must also support increasingly high aggregate data rates, potentially up to 100 Gb/s, such that fiber-optic links emerge as the optimal approach. The wired network must also provide potential access to the aggregate traffic to as many as 1000 wireless base stations per fiber-optic link, which gives rise to significant challenges in statistical bandwidth multiplexing, network management, as well as cost and complexity.

The present invention greatly reduces the optical wavelength resources needed to realize fourth generation (4G) and beyond mobile backhaul, which greatly simplifies network management. Moreover, by employing a digital signal processing (DSP)-based OFDMA-PON approach, the architecture enables sub-wavelength statistical bandwidth multiplexing, low delay, low jitter, high data rates, and cost-efficient remote wireless base station hardware. Indeed, the present invention may efficiently support mobile backhaul for 4G and beyond wireless systems with femtocell base station densities that are as high as 1000 or more base stations per optical link.

For example, with ≥256 Orthogonal Frequency-Division Multiplexing (OFDM) subcarriers per λ, Orthogonal Frequency Division Multiple Access (OFDMA) is well suited for 4$^+$G downstream mobile backhaul over PON since low latency, virtual point-to-point links can be established in the frequency-domain to serve high-density cell areas. Moreover, 20-40 Gb/s/λ rates can be realized in <10 GHz bandwidth using multi-level modulation formats, enabling cost-efficient cell site optoelectronics. In terms of latency, for example, with a 215 MHz electronic clock, the computational latency for a 256-point FFT (the most computationally intensive part of DSP-based OFDMA subcarrier processing) can be maintained at or under $256/(215 \times 10^6)=1.2$ μs, which is substantially below the <1 ms latency requirements for 4G and beyond mobile backhaul. In the upstream, a judicious hybrid of digital signal processing (DSP)-enhanced digital radio over fiber (dRoF) and classical Time Division Multiple Access (TDMA) can be used to efficiently distribute intelligence and meet latency constraints. For example, a standard 1 ms frame from a 40 MHz LTE-A signal, consisting of 40,000 symbols, can be transmitted in a 4 μs TDMA slot using 10 Gb/s optical on-off keying (OOK). Up to 250 cell sites per λ can thus be accommodated with 4 μs×250=1 ms latency. The required DSP enhancement for this is a 4$^+$G transceiver (~1 GHz electronics) added to each cell site to convert the native 4$^+$G signal to OOK without the bandwidth expansion overhead of conventional dRoF, and to recover timing information needed for TDMA-based US traffic multiplexing. Moreover, since short fiber reach reduces differential power penalties for optical burst-mode reception, off-the-shelf 10 Gb/s Avalanche Photodiodes (APDs) rather than specialized 10 GHz burst-mode receivers can be used for upstream traffic aggregation.

For example, in one embodiment according to the present principles, for >100 Mb/s per-cell mobile backhaul to 200 cells over 1.645 km SSMF, OFDMA may be employed according to the present principles in the downstream to establish low latency, virtual point-to-point links in the frequency-domain by assigning one or more OFDMA electronic frequency-domain subcarriers to each wireless cell site. Moreover, an off-the-shelf Avalanche Photodiode (APD) (e.g., 10 Gb/s) may be employed for upstream burst-mode Time Division Multiple Access (TDMA) traffic multiplexing enabling a 3 dB dynamic range tolerance subject to low latency (e.g., <1 ms). However, it is noted that in other embodiments, OFDMA may also be used to establish low latency, virtual point-to-point links in the frequency-domain in the upstream, without loss of generality. As such, the present principles may be advantageously applied to achieve high speed, low latency, and low cost for fourth generation (4G) and beyond mobile backhaul.

In one embodiment, OFDMA-PON may be employed according to the present principles to greatly reduce the wavelength resources needed with wavelength-division multiplexing (WDM)-PON, while also enabling sub-wavelength, electronic-domain statistical bandwidth multiplexing and high aggregate per-wavelength data rates. In one embodiment employing OFDMA-PON, digital signal processing (DSP) is employed to achieve low latency (employed for mobile backhaul), low jitter, and high throughput in a small electrical bandwidth using advanced multi-level modulation such as M-ary quadrature amplitude modulation (QAM). In this way, by exploiting DSP functionality, the remote wireless base station optical receiver hardware may be made simple and cost-efficient. In the upstream, a digitized radio-over-fiber approach may be employed to maintain remote base station cost-efficiency, enable sub-wavelength statistical bandwidth multiplexing, and to reduce the wavelength resources needed to function.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments described herein may be entirely hardware, entirely software or including both hardware and software elements. In a preferred embodiment, the present invention is implemented in software, which includes but is not limited to firmware, resident software, microcode, etc.

Referring now to FIG. 1, an Orthogonal Frequency Division Multiple Access/Time Division Multiple Access-Passive Optical Network (OFDMA/TDMA-PON) architecture according to the present principles is illustratively shown. A high level overview of the system includes a central office 102, a backhaul link 140, a plurality of cell sites 120, and at least one Mobile Backhaul Optical Network Units (MBH ONUs) 112. According to one embodiment, a novel downstream/upstream (DS/US) OFDMA/TDMA-PON architecture with MBH ONUs 112 featured at fourth generation (4G) and beyond (4$^+$G) cell sites 120 is illustratively shown. For example, in one embodiment according to the present principles, for a backhaul link 140 with aggregate distance $D=d_1+d_2+\ldots+d_M=1.6$ km (last-mile backhaul) and a 4$^+$G per-cell coverage radius of 16 m, the aggregate passive split ratio, for example, $N=N_1 \times N_2 \times \ldots N_M \approx 2 \times (1600 \text{ m}/16 \text{ m})=200$, to support high-density 4$^+$G cells on both sides of a fiber link 116 and 117. In one embodiment according to the present principles, for downstream 105 (DS) transmission, a baseband OFDMA signal is first generated at a central office 102 in the OFDMA digital signal processing (DSP) transmitter (Tx) 112. By assigning orthogonal subcarriers to different cell sites 120, virtual point-to-point links are created in the frequency domain to support low latency transmission of 4$^+$G traffic. In another example, with a 24 Gb/s/λ OFDMA signal, after accounting for 7% forward error correction (FEC) and 3.75% training overhead, a 21.4 Gb/s/λ payload may be apportioned to 200 cell sites at 100 Mb/s guaranteed per-cell rates, with an extra 1.4 Gb/s reserved to enable 1 Gb/s and beyond peak rates via OFDMA-based bandwidth sharing. Although a standard single mode fiber (SSMF) and an optical network are illustratively shown according to the present principles, it is contemplated that other sorts of transmission media and signal types may be employed for any number of cell sites.

In another embodiment, following digital to analog conversion (DAC) 110, and optical modulation using a modulator (e.g., intensity modulator (IM)) 106 and a laser (e.g., continuous wave (CW) distributed feedback (DFB) laser) 104, the Downstream (DS) OFDMA signal may be distributed over a link (e.g., fiber link) 116. In one embodiment, because of a short optical fiber reach, neither cyclic prefix overhead nor optical single-sideband (OSSB) filtering is needed to manage chromatic dispersion effects on an optical OFDMA signal. At each MBH ONU 122, the DS signal 105 may be directly photodetected and digitized using a photodiode (PD) 134 and an analog-to-digital (ADC) converter 132. The DS traffic for each cell site may then be digitally extracted by an OFDMA DSP receiver (Rx) 130, remodulated into a target wireless format by a 4$^+$G transceiver 138, and distributed via an antenna (e.g., radio frequency (RF) antenna) 128. For upstream (US) transmission 109, at each MBU ONU 122, the US analog wireless signal is demodulated by the transceiver 138, and converted to a baseband on-off keying (OOK) stream, which in one embodiment may optically modulate a directly modulated laser (DML) 126 (e.g., 10 GHz DML).

For example, in one embodiment, with 4 µs TDMA slots and 10 Gb/s OOK, a 1 ms 4$^+$G frame from 200 or more cells may be transmitted at 0.8 ms latency. Moreover, with 200 or more cells per US link, 50 Mb/s guaranteed, and more than 10 Gb/s peak per-cell rates can be achieved by employing the present principles. To synchronize US transmission, timing information from pre-reserved OFDMA subcarriers used for DS OFDMA synchronization is exploited by the upstream dynamic bandwidth allocation (DBA) module 136. Furthermore, because of a short fiber reach, an optical power differential between loud and soft US TDMA packets can be reduced compared to traditional TDMA-PON, such that an avalanche photodiode (APD) 108 without a specialized transimpedance gain burst switch may be used for photodetection and burst-mode US traffic multiplexing, and may include a control plane (e.g., router control plane) 114 to control traffic of a network (e.g., routing functions, incoming packets, etc.). Consequently, efficient statistical traffic aggregation from the 200 or more cell sites may be done without coherent Optical Line Terminal (OLT)-side OFDMA detection with high-speed digital signal processing (DSP), or a complex wavelength division multiplexing (WDM)-based wavelength plan.

Figure 2:
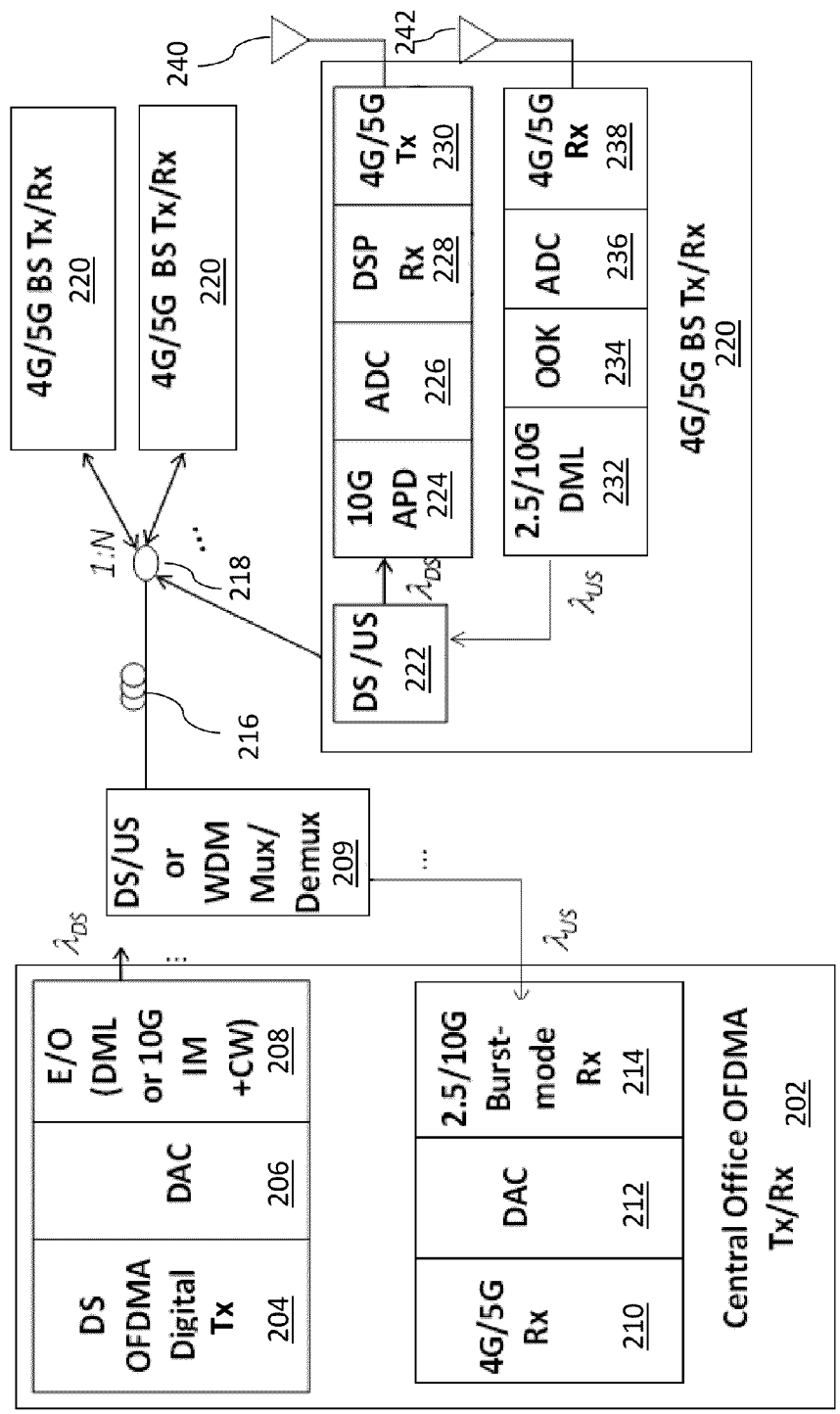
FIG. 2 is a block diagram illustrating a central office and base station (BS) transceiver architectures according to the present principles.

Referring now to FIG. 2, a block diagram of a central office and base station (BS) receiver is illustratively shown according to the present principles. Detailed operational principles of a central office OFDMA-based transceiver 202 and a plurality of base station (BS) transceivers 220 (e.g., 4G/5G) are illustratively shown. In one embodiment according to the present principles, for DS transmission, high-speed (e.g., 40 Gb/s/λ-60 Gb/s/λ) baseband OFDMA signals may be generated in a digital transmitter (Tx) 204. In one embodiment, with the use of advanced multilevel modulation (e.g., QAM, OFDM), a high-speed signal requires only a comparatively small bandwidth (e.g., 4 GHz-6 GHz), such that it may be cost-efficiently photodetected by an optical receiver 214 (e.g., 10 GHz optical receiver) at a remote base station site 220. In one embodiment, following digital to analog conversion (DAC) 206 and electro-optic (E/O) conversion 208 using either a directly modulated laser (DML) or an intensity modulator (IM) (e.g., 10 GHz IM) with a continuous wave (CW) laser 208, the DS signal on wavelength $\lambda_{DS}$ may be distributed over a fiber optic SSMF link 216. In one embodiment, to extend an OFDMA-PON to a WDM-OFDMA-PON, a WDM multiplexer/demultiplexer (mux/demux) 209 may be employed. A similar approach may be employed to realize DS/US signal aggregation at the central office 202. In one embodiment, optical couplers and/or circulators may be employed to achieve the DS/US aggregation 209.

In one embodiment according to the present principles, after SSMF transmission 216 and a 1:N passive split 218, the downstream signal may be photodetected using a photodiode 224 (e.g., 10 GHz avalanche photodiode (APD)), which enables high optical sensitivity without remote-side optical amplification. For DS/US wavelength separation 222, optical couplers or a circulator may be employed. Due to the high spectral efficiency, the high-speed signal may be digitized using an analog-to digital converter (ADC) 226 (e.g., 10-12 Gs/s) with a high resolution. Currently commercially available ADCs (e.g., 12 Gs/s ADCs with 14 bit resolution) may be cost-efficiently employed for this application. In one embodiment, in the DSP receiver (Rx) 228, the DS traffic for each given wireless base station (which may range up to 1 Gb/s peak rates) may be digitally extracted by employing OFDMA subcarrier de-multiplexing. The extracted subcarriers are then re-modulated in the appropriate 4G/5G wireless signal format using, for example, standard wireless radio frequency (RF) hardware in block 230. While standard wireless RF hardware is illustratively shown, it is contemplated that other sorts of hardware may also be employed according to the present principles.

For example, in one embodiment, an optical OFDMA signal on a single optical wavelength may be composed of a plurality of frequency-domain OFDMA subcarriers (e.g., 256 frequency-domain OFDMA subcarriers) that have sub-wavelength granularity. Each of the subcarriers may be assigned to a different base station/cell site (e.g., 256 base stations/cell sites) while using just one optical wavelength. Because the present principles enable one wavelength to accommodate a plurality of OFDMA subcarriers, OFDMA-PON greatly reduces the needed wavelength resources compared to legacy systems. Moreover, the OFDMA subcarriers may be assigned to different base stations in a dynamic way, according to real-time traffic needs, enabling frequency-domain statistical multiplexing. Furthermore, each OFDMA subcarrier may be modulated using advanced multi-level modulation (e.g., M-ary Quadrature Amplitude Modulation (QAM)) to achieve a high aggregate data rate per wavelength (e.g., >10 Gb/s).

For example, in 4G modulated in the appropriate 4G/5G wireless signal format using standard wireless radio frequency (RF) hardware in block 230 may be employed. While standard wireless RF hardware is illustratively shown, it is contemplated that other sorts of hardware and signals may also be employed according to the present principles. For example, in 4G long term evolution (LTE), OFDM may also be employed, thereby enabling a smooth translation of the signal to the wireless domain. In one embodiment, N base stations may be combined and received by a receiver 214 (e.g., 2.5G or 10G optical burst-mode receiver). As was the case in the downstream, for example, in one embodiment, for upstream DS/US wavelength separation at the central office 202, optical couplers or a circulator may be employed according to the present principles. With current technology, a burst-mode receiver may operate at rates up to 10 Gb/s, which is sufficient to function in the system according to the present principles.

In one embodiment according to the present principles, following optical burst-mode reception in block 214, a DAC 212 may be employed to directly recover the RF-domain signals from the wireless base stations, which may be subsequently processed for data recovery using standard 4G/5G hardware in block 210. Consequently, the use of the burst-mode upstream receiver 214 in one embodiment achieves highly efficient sub-wavelength statistical traffic multiplexing from as many as 1024 base stations, without the need for ultra-high ADC/DAC/DSP components. While 4G/5G wireless signal formats are illustratively shown according to the present principles, it is contemplated that other sorts of wireless signal formats and equipment may also be employed according to the present principles.

Figure 3:
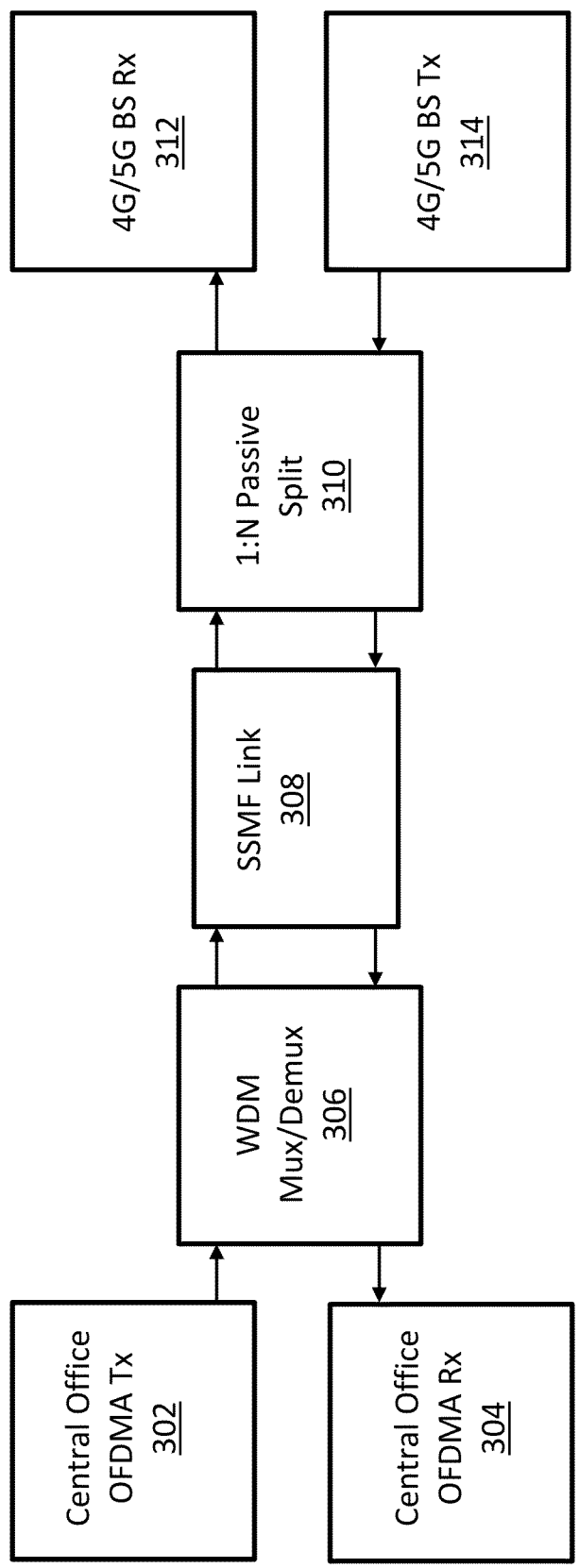
FIG. 3 is a block/flow diagram of a system/method for Orthogonal Frequency Division Multiple Access/Time Division Multiple Access-Passive Optical Network (OFDMA/TDMA-PON) architecture for femtocell 4G and beyond mobile backhaul according to the present principles.

Referring now to FIG. 3, a block diagram illustrates an OFDMA-PON architecture for femtocell 4G and beyond mobile backhaul according to one embodiment employing the present principles. In one embodiment, the transceiver structures of the central office Tx/Rx 302 and 304, respectively, and remote BS Tx/Rx 312 and 314, respectively, are advantageously employed according to the present principles. In one embodiment, a novel WDM mux/demux 306 is advantageously employed and the present system does not require the use of a dedicated wavelength per BS 312 and 314, but rather a wavelength may be dedicated to a large group (e.g., N BS nodes, such that per-node traffic multiplexing/demultiplexing may be accomplished in the electronic domain using OFDMA). This is one significant difference compared to previous WDM-PON solutions for mobile backhaul. Furthermore, in one embodiment, a passive optical splitter 310 may be advantageously employed rather than the radio network controller (RNC) nodes used in legacy 2G/3G mobile backhaul systems. Another significant difference between the present invention and legacy systems according to one embodiment is that digital intelligence may be distributed to the BS Tx/Rx 312 and 314, which obviates the need for RNC nodes, such that the network topology may be simplified (i.e., flattened), and a cost-efficient PON structure may be employed for optical signal distribution. Moreover, in one embodiment, the use of a passive splitter 310 supports electronic-domain statistical bandwidth multiplexing, as well as DSP-based low delay and low jitter features over an SSMF link. While a SSMF link and a passive split are advantageously employed according to the present principles, it is contemplated that other sorts of transmission media and splits may be employed according to the present principles.

Figure 4:
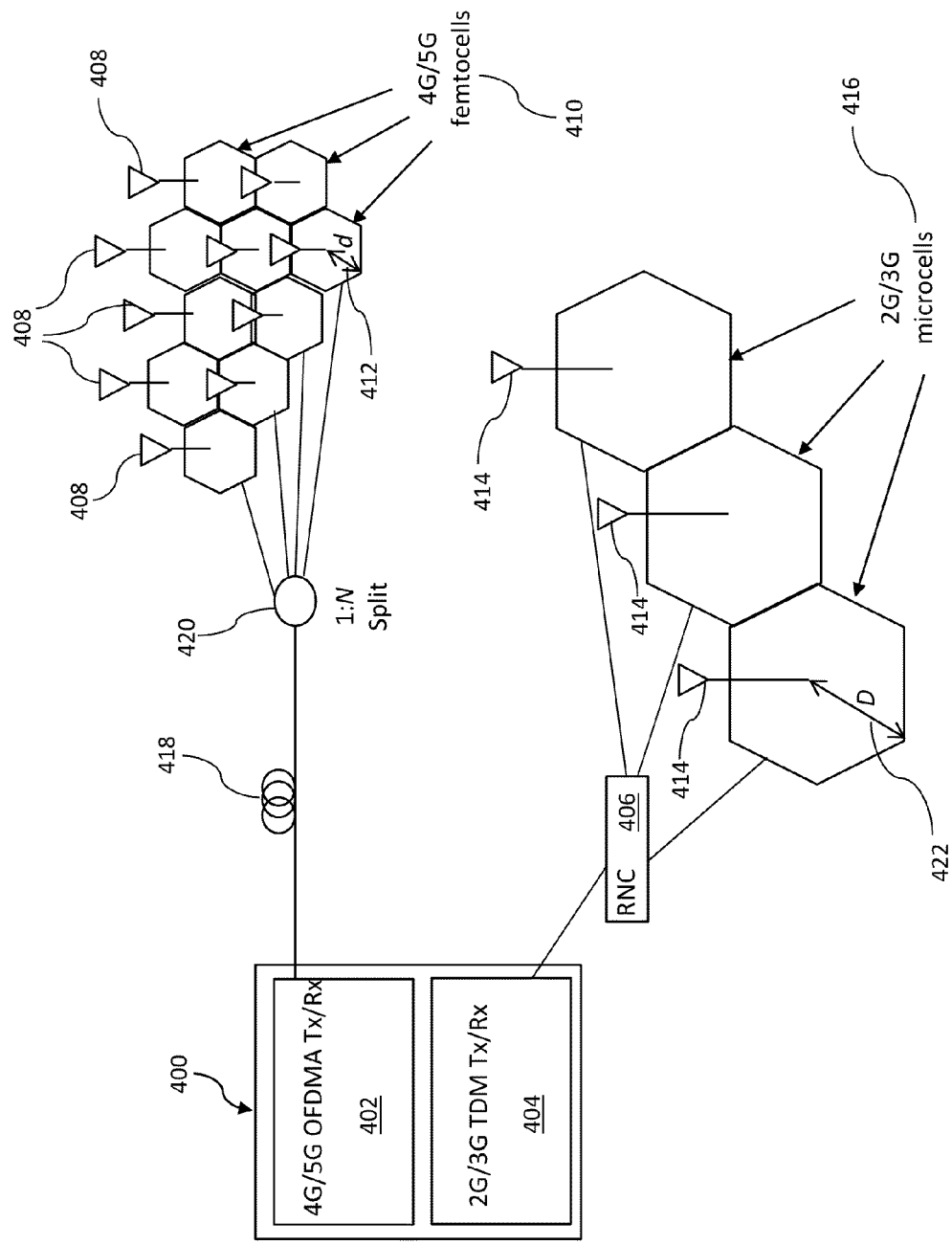
FIG. 4 is a diagram of a system for Orthogonal Frequency Division Multiple Access/Time Division Multiple Access-Passive Optical Network (OFDMA/TDMA-PON) architecture for 4G and beyond mobile backhaul according to the present principles.

Referring now to FIG. 4, a novel OFDMA-PON femtocell architecture for 4G and beyond mobile backhaul is shown according to one embodiment employing the present principles, and is contrasted with legacy 2G/3G backhaul networks to highlight the advantages of the present invention. In one embodiment according to the present principles, legacy 2G/3G sites may be supported at the central office 400 by a time-division multiplexing (TDM)-based transceiver 404. In one embodiment, each remote 2G/3G base station (BS) 414 connected to the central office 400 may cover a microcell area of radial distance, D 422, where D 422 may equal 1 to 2 km. The communication between the 2G/3G sites 414 may be managed by a remote network controller 406, which may be linked back to the central office 400, which allows for communication between 2G/3G microcells 416 and the central office 400. In one embodiment, the central office 400 is moreover responsible for communicating with a back-end packet-based network.

In one embodiment according to the present principles, the 4G/5G OFDMA-based femtocell architecture advantageously features many pronounced differences as compared to 2G/3G architectures, which will be discussed in detail below. In one embodiment, to enable ultra-high-speed transmission, the central office transceiver 402 advantageously employs OFDMA rather than TDM. Furthermore, in one embodiment according to the present principles, to enable high-speed reception, the radial coverage area, d 412, of each 4G/5G BS 408 at 4G/5G femtocells 410, is greatly reduced to be on the order of meters rather than kilometers. Moreover, in one embodiment, the 4G/5G BS 408 density is also greatly increased, and more than 1,000 4G/5G BS sites 408 may be supported by a single link from a central office 400. In one embodiment, unlike conventional OFDMA-PON, where the transmission distances range from 20-40 km and passive split ratios range from N=32-128, when employing the present principles, d is substantially smaller, while the split ratio may be as large as N=1024. To support the high-density, bandwidth-demanding 4G/5G remote nodes 408, a 40$^+$Gb/s/λ, OFDMA signal may be generated in the OFDMA-based transceiver 402 and transmitted over standard single mode fiber (SSMF) 418 to a 1:N passive splitter 420. While SSMF and a 1:N passive splitter are advantageously employed according to the present principles, it is contemplated that other sorts of transmission media and splitters may be employed according to the present principles.

In one embodiment according to the present principles, by moving intelligence into the 4G/5G BS nodes 408 a radio network controller (RNC) 406 from 2G/3G architecture may be removed because when employing the present principles, a simple passive splitter 420 is sufficient for optical-domain signal distribution. In one embodiment, in each 4G/5G BS 408, designated traffic may be recovered digitally via OFDMA processing in block 402. In one embodiment, US transmission may readily be accomplished over the same network architecture, by employing digitized radio-over-fiber (RoF) (not shown). Furthermore, in one embodiment, the OFDMA-PON architecture may be combined with wavelength division multiplexing (WDM) (not shown), wherein a different optical wavelength is employed to serve each group of N 4G/5G BS sites 408. In one embodiment, WDM-OFDMA-PON may be employed, and the passive split ratio per wavelength may be further reduced. For example, in one embodiment, with W=4 downstream/upstream (DS/US) wavelength pairs (not shown), $\lambda_{i,DS}/\lambda_{i,US}$, I=1, ..., 4 (W=4), a total of N=1024 BS may be served with a 1:N/W=1:256 passive split per wavelength pair. In this embodiment, power budget constraints may be alleviated if desired, without significantly complicating network/wavelength management or incurring high latencies. While WDM-OFDMA-PON and a passive split are advantageously employed according to the present principles, it is contemplated that other sorts of transmissions and splits may be employed according to the present principles.

Figure 5:
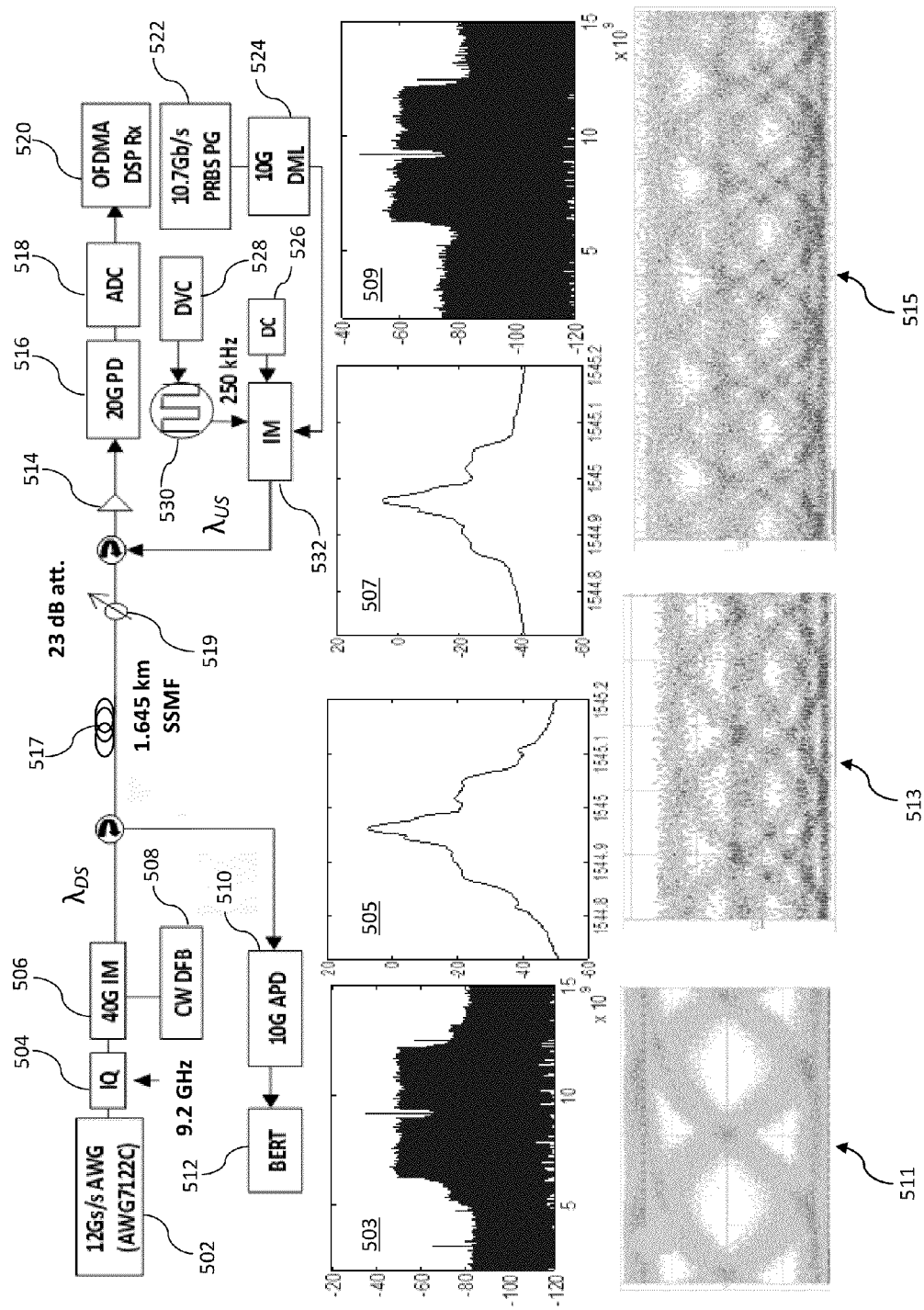
FIG. 5 is a system/method illustrating one embodiment of Orthogonal Frequency Division Multiple Access/Time Division Multiple Access-Passive Optical Network (OFDMA/

Referring now to FIG. 5, system/method illustrating one embodiment of Orthogonal Frequency Division Multiple Access/Time Division Multiple Access-Passive Optical Network (OFDMA/TDMA-PON) architecture for 40 and beyond mobile backhaul with spectra according to the present principles is shown. In one embodiment according to the present principles, a signal (e.g., 24 Gb/s OFDM signal with 16-QAM symbol mapping and a Fast Fourier Transform (FFT) size of 256) composed of two sub-bands (e.g., 3 GHz OFDM sub-bands) and separated by a guard-band (e.g., 562.5 MHz guard-band), may be generated offline, and output continuously by an arbitrary waveform generator (AWG) 502 (e.g., 12 GS/s AWG) and upconverted (e.g., upconverted to $f_{RF}$=9.2 GHz) using a mixer 504 (e.g., in-phase quadrature (IQ) mixer). In one embodiment, for example, the signal spectrum after IQ mixing is shown in spectrum 503. The selection of $f_{RF}$ may be dictated by the lower edge IQ mixer 504 cut-off frequency. In one embodiment, for commercial IQ mixers operating at frequencies ≥2 GHz, the signal of spectra 503, for example, may occupy <10 GHz total bandwidth.

For example, in one embodiment according to the present principles, after 7% forward error correction (FEC) and 3.75% training overhead, the raw data rate is 21.4 Gb/s. For DS transmission, a C-band DFB CW laser 508 ($\lambda_{DS}$=1544.96 nm) and a 40 GHz optical intensity modulator (IM) 506 biased at quadrature may be employed to generate an optical OFDMA signal represented in spectra 505. While a C-band DFB laser and 40 GHz optical intensity modulator are illustratively shown, it is contemplated that other sorts of lasers and modulators may be employed according to the present principles. In an illustrative embodiment, the DS signal may be transmitted over 1.645 km of SSMF 517 (SMF-28) followed by a 1:200 passive split at an attenuator 519 (e.g., 23 dB extra attenuation), which may be boosted by employing a commercial semiconductor optical amplifier (SOA) 514 with 25 dB gain and 7.2 dB noise figure (represented in spectra 507), and may be photodetected by employing a 20 GHz photodiode (PD) 516.

For example, in one embodiment according to the present principles, a 50 GS/s real time oscilloscope may be employed to perform analog to digital conversion (ADC) 518, with the post-detection processings, including digital downconversion, OFDM demodulation, channel equalization, and bit error rate (BER) computation based on, for example, 0.25 measured bits, implemented in off-line digital signal processor (DSP) 520, represented by spectra 509. In one embodiment, single-fiber DS/US operation may be achieved by employing two circulators (e.g., 0.55 dB loss/circulators). For US transmission, a 10 GHz Data Manipulation Language (DML) 524 with $\lambda_{US}$=1549.55 nm and 5 dBm output power may be modulated with a 10.7 Gb/s non-return-to-zero (NRZ)-OOK Pseudo Random Binary Sequence (PRBS) of length $2^{31}$-1 from a pattern generator (PG) 522 to obtain the signal represented in spectra 511.

In one embodiment, dual optical network unit (ONU) burst mode US transmission with a 4 µs TDMA slot time may be emulated by applying the 10 GHz DML 524 output as input to an optical intensity modulator (IM) 532 driven by a 1/(4 µs)=250 kHz square wave signal 530 (i.e., US signal from a second ONU) and may be employed when employing a dynamic voltage controller (DVC) 528. In one embodiment, by changing the drive voltage of the 250 kHz signal and the direct current (DC) 526 bias of the intensity modulator (IM) 532, a variable optical power level differential may be created, and is represented by spectra 513. In one embodiment, after US transmission over the same fiber link, the emulated dual-ONU burst mode signal may be directly photodetected by an off-the-shelf 10 Gb/s avalanche photodiode (APD) 510, which is represented by spectra 515. A bit error rate tester (BERT) 512 operated in continuous mode may be employed to measure the US bit error rate (BER). While a dual ONU burst mode US transmission and an optical IM 532 are illustratively employed to emulate burst-mode transmission, it is contemplated that other sorts burst-mode transmission mechanisms may also be employed according to the present principles.

Figure 6:
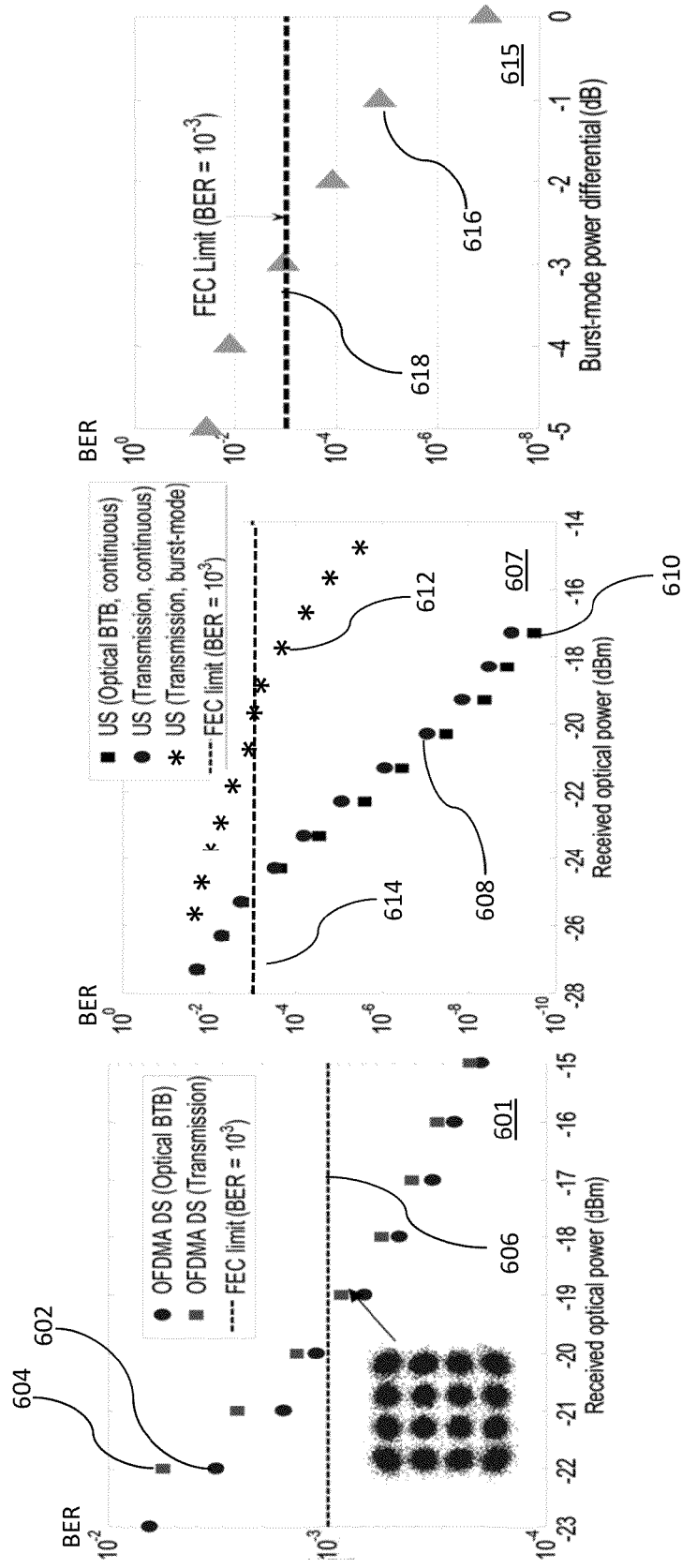
FIG. 6 illustrates plots of bit error rate (BER) versus power for Orthogonal Frequency Division Multiple Access/Time Division Multiple Access-Passive Optical Networks (OFDMA/TDMA-PON).

Referring now to FIG. 6, plots of bit error rate (BER) versus power for Orthogonal Frequency Division Multiple Access/Time Division Multiple Access-Passive Optical Networks (OFDMA/TDMA-PON) are illustratively shown according to the present principles. According to one embodiment, plots of measured DS BER 601, US BER 607, and burst-mode dynamic range tolerance for OFDMA/TDMA-PON (i.e., US burst-mode power differential BER tolerance) 615 are illustratively shown. As shown in plot 601, for example, for the DS OFDMA architecture the penalty between optical back-to-back (BTB) 602 and fiber backhaul transmission 604 was negligible, with a −19 dBm receiver sensitivity achieved at the FEC limit (BER=$10^{-3}$) 614, which may correspond to 6 dBm DS launch power.

In one embodiment, as shown in plot 607, the US optical back-to-back (BTB) continuous transmission (single-ONU) 610, and US continuous fiber backhaul transmission the FEC limit may be achieved at −25 dBm received power, and there is virtually no penalty with respect to optical back-to-back (BTB) transmission. For the dual-ONU burst-mode case with a 3 dB inter-ONU power differential, a received power of −20 dBm may be employed. In one embodiment, the slope of the burst mode transmission BER 612 curve may be more gradual at least because the OOK signal eye may be suppressed by the 3 dB received power difference. The burst-mode power differential between the two US signals may also be varied for a fixed −20 dBm received power, with the results shown in plot 615. At −20 dBm receiver sensitivity, the FEC limit may be confirmed for burst-mode power differentials 616 up to 3 dB, where the FEC limit 618 may have a BER=$10^{-3}$. This result is significantly higher than the 0.3-0.4 dB dynamic range capability set by 1-2 km SSMF reach. Consequently, transimpedance gain burst switches may be eliminated from APD designs for burst mode operation in mobile backhaul when employing the present principles, enabling lower cost fabrication compared to devices for applications with high dynamic range mandates.

Having described preferred embodiments of a system and method for an Orthogonal Frequency Division Multiple Access/Time Division Multiple Access-Passive Optical Network (OFDMA/TDMA-PON) for >100 Mb/s per-cell mobile backhaul (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for network communication using a plurality of base stations and an optical backhaul network, the method comprising:
    generating an optical double sideband (ODSB) optical orthogonal frequency division multiple access (OFDMA) signal on an optical wavelength, with the ODSB optical OFDMA signal being composed of a plurality of OFDMA subcarriers;
    modulating each of the plurality of OFDMA subcarriers using multi-level modulation;
    propagating each of the plurality of OFDMA subcarriers to different base stations using a single optical wavelength over a passive optical network (PON) using a passive optical splitter;
    delivering the ODSB optical OFDMA signal to a plurality of different base stations using a passive optical splitter;
    extracting traffic for each of the plurality of base stations in an electronic-domain using OFDMA subcarrier de-multiplexing, wherein the extracted traffic is remodulated in a wireless signal format;
    transmitting a wireless signal using antennas at each of the plurality of base stations; and
    recovering and processing the wireless signal from the plurality of base stations.

2. The method of claim 1, wherein the multi-level modulation is implemented using digital signal processing (DSP) with no cyclic prefix insertion and removal.

3. The method of claim 1, wherein wireless signals from two or more base stations are transmitted/received over a digital radio-over-fiber (RoF) optical backhaul network with optical time-domain sharing of a same wavelength.

4. The method of claim 3, further comprising accommodating optical burst-mode reception at the central office side using avalanche photodiodes (APDs) with no specialized transimpedance gain burst switches.

5. The method of claim 1, further comprising employing an orthogonal frequency division multiple access—passive optical network (OFDMA-PON) using a passive optical splitter with 1:N split ratios, where N is greater than or equal to 256, to enable optical-domain traffic aggregation and deaggregation for a high density of base stations.

6. The method of claim 1, further comprising dynamically allocating each of the plurality of OFDMA subcarriers with low differential delay and latency of OFDMA subcarrier assignment to the different base stations according to real-time traffic demands.

7. A system for network communication using a plurality of base stations and an optical backhaul network, the system comprising:
    an optical double sideband (ODSB) orthogonal frequency division multiple access (OFDMA) signal generated on an optical wavelength, with the ODSB optical OFDMA signal being composed of a plurality of OFDMA subcarriers;
    a multi-level modulator configured to modulate each of the plurality of OFDMA subcarriers;
    a single optical wavelength configured to propagate each of the plurality of OFDMA subcarriers to different base stations over a passive optical network (PON);
    a passive optical splitter used to deliver ODSB optical OFDMA signals to a plurality of different base stations;
    an OFDMA subcarrier de-multiplexer configured to deliver and extract traffic for each of the plurality of base stations in an electronic-domain, wherein the extracted traffic is remodulated in a wireless signal format; and
    antennas at each of the plurality of the base stations which transmit wireless signals, wherein the wireless signals are recovered and processed from the plurality of base stations.

8. The system of claim 7, wherein the multi-level modulator is configured to modulate the optical OFDMA signal using digital signal processing (DSP) with no cyclic prefix insertion and removal.

9. The system of claim 7, wherein signals from multiple base stations are transmitted and received over a a digital radio-over-fiber (RoF) optical backhaul network with optical time-domain sharing of a same wavelength.

10. The system of claim 9, further comprising a central office which employs avalanche photodiodes (APDs) with no specialized transimpedance gain burst switches to achieve optical burst-mode reception.

11. The system of claim 7, further comprising an orthogonal frequency division multiple access—passive optical network (OFDMA-PON) configured to enable optical-domain traffic aggregation and deaggregation with 1:N split ratios, where N is greater than or equal to 256, to enable optical-domain traffic aggregation and deaggregation for a high density of base stations.

12. The system of claim 7, wherein each of the plurality of OFDMA subcarriers is dynamically allocated to the different base stations according to real-time traffic demands with low differential delay and latency of OFDMA subcarrier assignment to the different base stations.

* * * * *